(12) United States Patent
Povolny

(10) Patent No.: US 9,495,570 B2
(45) Date of Patent: Nov. 15, 2016

(54) METHOD FOR AUTHENTICATING AN RFID TAG

(71) Applicant: Kapsch TrafficCom AG, Vienna (AT)

(72) Inventor: Robert Povolny, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 128 days.

(21) Appl. No.: 14/324,918

(22) Filed: Jul. 7, 2014

(65) Prior Publication Data

US 2015/0022314 A1   Jan. 22, 2015

(30) Foreign Application Priority Data

Jul. 17, 2013  (EP) .................................... 13176875

(51) Int. Cl.

| | | |
|---|---|---|
| G06K 7/10 | (2006.01) | |
| G06F 21/46 | (2013.01) | |
| G06F 21/43 | (2013.01) | |
| G06F 21/44 | (2013.01) | |
| G06F 21/45 | (2013.01) | |

(52) U.S. Cl.
CPC ........... *G06K 7/10366* (2013.01); *G06F 21/43* (2013.01); *G06F 21/44* (2013.01); *G06F 21/445* (2013.01); *G06F 21/45* (2013.01); *G06F 21/46* (2013.01)

(58) Field of Classification Search
CPC ...... G06F 21/445; G06F 21/44; G06F 21/45; G06F 21/46; G06F 21/43; G06K 7/10366; G06K 7/0008; G06K 7/10019
See application file for complete search history.

(56) References Cited

U.S. PATENT DOCUMENTS

| | | | | |
|---|---|---|---|---|
| 6,480,101 B1 * | 11/2002 | Kelly | ................... | G06K 7/0008 340/10.2 |
| 7,750,793 B2 * | 7/2010 | Juels | ..................... | G06K 7/0008 340/10.1 |
| 2003/0234718 A1 * | 12/2003 | Fujisawa | .............. | G06K 7/0008 340/5.1 |
| 2004/0233040 A1 * | 11/2004 | Lane | .................... | G06K 19/025 340/5.86 |
| 2005/0061875 A1 * | 3/2005 | Zai | ....................... | G06K 7/0008 235/383 |
| 2006/0022799 A1 * | 2/2006 | Juels | ................... | G06K 7/10019 340/10.1 |
| 2010/0289627 A1 | 11/2010 | McAllister et al. | | |
| 2014/0225715 A1 * | 8/2014 | Moran | ............... | G06K 7/10019 340/10.1 |

FOREIGN PATENT DOCUMENTS

WO    2008/085135 A1    7/2008

OTHER PUBLICATIONS

"EPC Radio Frequency Identity Protocols Class-1 Generation-2 UHF RFID Protocol for Communication at 860 MHz-960 MHz, Version 1.2.0", Specification for RFID Air Interface, EPC Global Inc., Oct. 23, 2008, pp. 1-108.
Extended European Search Report Received for EP Patent Application No. 13176875.6, mailed on Jan. 8, 2014, 6 pages.

* cited by examiner

*Primary Examiner* — Hai Phan
*Assistant Examiner* — Son M Tang
(74) *Attorney, Agent, or Firm* — Fiala & Weaver, P.L.L.C.

(57) ABSTRACT

A method for authenticating an RFID tag with the aid of an RFID reader via a radio interface, wherein a user-specific key is stored in the RFID reader and a tag-specific identifier and a password generated from the identifier and the key in accordance with a known derivative function are stored in the RFID tag, comprising the following steps performed in the RFID reader: receiving via the radio interface the identifier of an RFID tag to be authenticated, generating the correct password from the received identifier and the stored key according to the known derivative function, and generating at least one incorrect password differing from the correct password, sending a series of at least two passwords, at least one being correct and at least one being incorrect, via the radio interface to the RFID tag, and authenticating the RFID tag if no confirmation response is received to any incorrect password.

10 Claims, 2 Drawing Sheets

METHOD FOR AUTHENTICATING AN RFID TAG

CROSS-REFERENCE TO RELATED APPLICATION(S)

This application claims priority to European Patent Application No. 13 176 875.6, filed on Jul. 17, 2013, the entirety of which is incorporated by reference herein.

BACKGROUND

1. Technical Field

The present application relates to a method for authenticating an RFID tag by means of an radio-frequency identification (RFID) reader via a radio interface therebetween, wherein a user-specific key is stored in the RFID reader and a tag-specific identifier and a password generated from the identifier and the key in accordance with a known derivative function are stored in the RFID tag.

2. Background Art

RFID tags (radio frequency identification tags or transponders) of this type are not only widespread in merchandise logistics for product marking (see e.g., "Specification for RFID Air Interface EPC™ Radio-Frequency Identity Protocols Class-1 Generation-2 UHF RFID Protocol for Communications at 860 MHz Version 1.2.0 Copyright notice Contents", 23 Oct. 2008 (2008-10-23), XP055093111), but are also being used increasingly as wirelessly readable vehicle identifiers or wirelessly readable driver IDs in road toll and traffic monitoring systems (electronic toll collection, ETC; automatic vehicle identification, AVI). Here, emphasis is placed on the counterfeit protection of the RFID tag in order to prevent a vehicle registration number or a user identity from being falsified and an individual accumulating costs or charges accrued as a result of third party toll fees or traffic offences.

Simple authentication protocols have already been implemented in the most widespread RFID tag standards, for example in ISO standards 18000-6C and 18000-63. These authentication protocols are based on the use of the aforementioned password (access password), which is composed on the one hand from a secret key known only to the user issuing the RFID tags and an individual tag identifier stored in each tag. Only this password is stored in the respective tag. The key cannot be reconstructed merely with the knowledge of the password, that is to say the derivative function (formation function) for the password is irreversible or cannot be uniquely reversed. If an RFID reader would like to verify the authenticity of an RFID tag, it first reads the tag-specific identifier from the RFID tag and reproduces the password (access password) in the knowledge of the user-specific key and sends this to the RFID tag. The RFID tag checks the received password with the stored password and, in the case of a match, sends a confirmation response back to the RFID reader, which assesses this as proof of the authenticity of the RFID tag, see e.g. US 2010/0289627 A1 or WO 2008/085135 A1.

BRIEF SUMMARY

An object of the present subject matter is to make such a method for authenticating RFID tags more secure in order to identify attempted fraud.

The object is achieved with a method of the aforementioned type, wherein the following steps are performed in the RFID reader:

receiving via the radio interface the identifier of an RFID tag to be authenticated, generating the correct password from the received identifier and the stored key in accordance with the known derivative function, and generating at least one incorrect password differing from the correct password, sending a series of at least two passwords, of which at least one is correct and at least one is incorrect, to the RFID tag via the radio interface, and authenticating the RFID tag if no confirmation response to any incorrect password is received.

The present subject matter is based on the finding of the applicant that the known authentication protocols could be compromised if the RFID identifier is read out from a "genuine" tag and is copied into another ("forged") tag, which, since it does not have the knowledge of the correct password matching this tag identifier, responds to receipt of an arbitrary password with a confirmation response. Such forged tags can be realised very easily by "tag emulators", which reconstruct the RFID protocol, for example by means of a microcontroller; this allows a selective imitation of the behaviour of a tag by a forger. The applicant has recognised that, by repeatedly sending a number of passwords, of which at least one is "incorrect", it is possible to determine in a surprisingly simple manner whether the RFID tag is genuine or forged on account of the response of the RFID tag. The discussed authentication method requires no modification to the RFID tag itself, and therefore conventional RFID tags conforming to standards can still be used.

The order of correct and incorrect passwords in the aforementioned series may, for example, be selected randomly, such that a forged tag cannot expect a specific interrogation sequence and can for example respond with a standardised response sequence.

In accordance with a variant, the transmission of the series can be aborted as soon as a confirmation response to an incorrect password is received so as to minimise the occupancy of the radio interface. For the same reason, it is also possible for the transmission of the series to be aborted as soon as no confirmation response to a correct password is received, and the RFID tag is then not authenticated.

If no confirmation response to a correct password is received, this does not necessarily always indicate a forged RFID tag; it could also be merely that the radio interface has been interrupted because the RFID tag has left the range of the radio interface. In order to detect this, it may be, in accordance with a further variant, that the last password in the series is always a correct password: if no confirmation response is received within a predefined period, the radio interface is interrupted and was possibly also interrupted earlier, in the case of an incorrect password, such that the entire authentication process is cancelled and the RFID tag is not authenticated.

Alternatively, the transmission of the series can be continued as long as the RFID tag is within the range of the radio interface, such that a maximum number of password transmissions (correct and incorrect) can be performed, which minimises the chances of successful fraud with a forged RFID tag. The checking as to whether the RFID tag is still in range can here be measured by radio interrogations output by the RFID reader; as soon as such a radio interrogation no longer receives a response, the range has clearly been interrupted.

In accordance with a further feature, the identifier of an RFID tag, which has once sent a confirmation response to an incorrect password, can be stored in a blacklist so as to then take appropriate measures. For example, once the identifier of an RID tag to be authenticated has been received, it is possible to check whether the received identifier is stored in the blacklist, and, if so, the RFID tag is not authenticated and the method is aborted. An RFID tag once identified as being forged can then no longer be used.

The subject matter is suitable for all those communication standards between

RFID tags and RFID readers that use the aforementioned authentication protocol with access passwords, in particular for ISO standards 18000-6C and 18000-63 or standards compatible therewith, and requires no modification of the RFID tags. This is particularly advantageous since RFID tags are a cost-effective mass product, which are in wide circulation in many forms provided by a wide range of manufacturers and have to fulfil merely the minimum requirements of the mentioned standard, such that a modification of the standard with respect to this minimum requirement is not necessary for the authentication method discussed here.

Further features and advantages, as well as the structure and operation of various embodiments, are described in detail below with reference to the accompanying drawings.

BRIEF DESCRIPTION OF THE DRAWINGS/FIGURES

The present subject matter will be explained in greater detail hereinafter on the basis of exemplary embodiments illustrated in the accompanying drawings, in which.

Embodiments will now be described with reference to the accompanying drawings.

DETAILED DESCRIPTION

Figure 1:
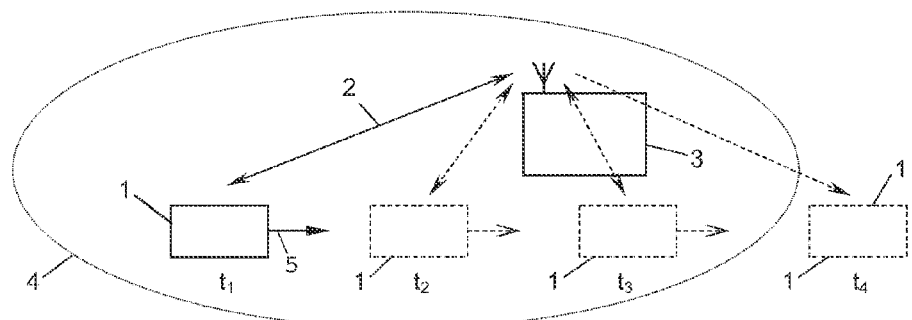
FIG. 1 shows the radio communication conditions between an RFID reader and a RFID tag passing the RFID reader within the scope of the method, according to an embodiment.

FIG. 1 shows an RFID tag (radio frequency identification tag) 1, which establishes radio communication with an RFID reader 3 at a moment in time $t_1$ via a radio interface 2. The range of the radio interface 2 around the reader 3 is denoted by 4. The tag 1 moves past the reader 3 in the direction of the arrow 5. Dashed lines denote three further positions of the tag 1 at successive moments in time $t_2$, $t_3$, $t_4$, at each of which further radio communication takes place via the radio interface 2.

The content of the radio communications or data packets, which are exchanged via the radio interface 2 between the tag 1 and reader 3, is arbitrary, and only those parts of the communication protocol via the radio interface 2 that are concerned with the authentication of the tag 1 to the reader 3 will be described hereinafter.

The components and fundamental method steps involved in the authentication process will be explained with reference to FIG. 2, which describes a tag 1 in accordance with ISO standard 18000-6C or 18000-63. Of course, the tag 1, the protocol over the radio interface 2, and the reader 3 can also be formed in accordance with another standard providing the described authentication functionalities.

Figure 2:
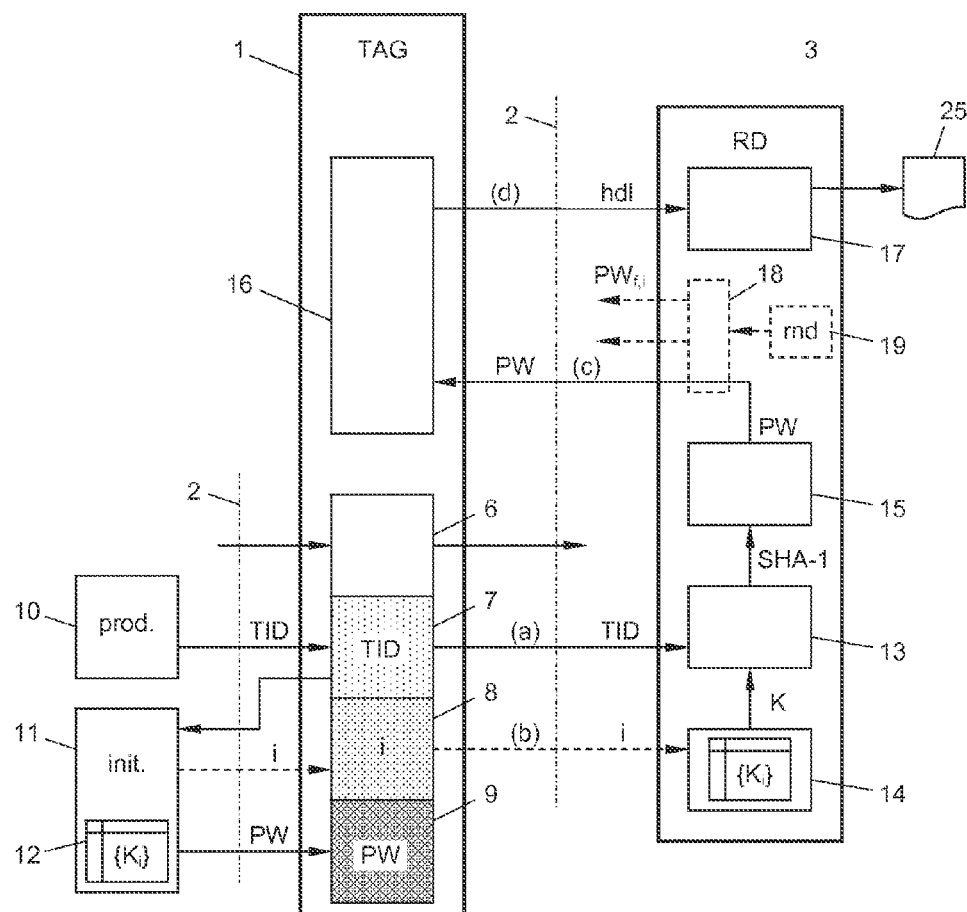
FIG. 2 shows a block diagram and simultaneously a flow diagram of the method, according to an embodiment.

According to FIG. 2 the tag 1 comprises four memory areas 6-9 protected to varying extent, more specifically:

a first memory area 6, which is readable and writable arbitrarily via the radio interface 2, for example for application programs that run on a reader 3;

a second memory area 7, which is readable via the radio interface 2, for receiving a unique tag-specific identifier TID; the memory area 7 is writable only during the manufacture of the tag 1 by a manufacturing process 10, which assigns the unambiguous tag identifiers TID, and is otherwise write-protected;

a third memory area 8, which can be written onto during the user-specific initialisation of the tag 1 by an initialisation process, is subsequently write-protected, and is then readable via the radio interface 2; the initialisation process 11 can be written onto with user-specific (operator-specific) data, for example by a user, for example a system operator, who acquires a batch of tags 1 having different tag identifiers TID, this data for example being an identifier of the operator or an index i, which refers to one of many user-specific keys $K_i$ stored in a key table 12 of the initialisation process 11; and a reserved memory area 9, which is not readable via the radio interface 2 and in which only data concerning the user initialisation process 11 can be stored, here a password (access password) PW, and which can only be accessed by certain processes in the tag 1 itself, as will be explained later in greater detail.

The password PW is formed during the initialisation of the tag 1 by the initialisation process 11 on the one hand from the tag identifier TID and on the other hand from the user-specific key $K_i$ for example in accordance with a hash algorithm of the following form:

$$PW=\text{truncate}(SHA\text{-}1(\text{concatenate}(K_i+TID))).$$

On the basis of this memory structure, configuration and initialisation, a tag 1 can be authenticated to a reader 3, which has the user-specific key(s) $K_i$, as follows.

In a first step (a) the tag identifier TID is read from the write-protected, yet publicly accessible memory area 7 via the radio interface 2 by a process 13 in the reader 3. In step (b) the key index i is then read from the write-protected, yet publicly accessible memory area 8 via the interface 2, and the corresponding key $K_i$ is fetched from a key table 14 of the reader 3 corresponding to the key table 12 of the user or initialisation process 11. If only a single key K is to be used, the storing and searching of the key index i is redundant, that is to say step (b) is omitted.

In the process 13, the hash value $$SHA\text{-}1(\text{concatenate}(K_i+TID))$$

is then formed and the access password PW for the tag 1 is generated by truncation in step 15.

The password PW is then transmitted in step (c) to a checking process 16 in the tag 1, which compares the received password PW with the password PW stored in the protected memory area 9 only accessible for the process 16. Only in the event of a match a confirmation response ("handle") hdl is sent back to the interrogating reader 3 via the radio interface 2 in a step (d); receiving such a confirmation response in the reader 3 authenticates the tag 1 as being genuine (authentic).

The following additions to the discussed method are used in order to prevent attempted fraud by means of forged tags 1, which always respond with a confirmation response hdl in step (d) to receipt of any password PW, even an incorrect password (that is to say a password not matching the password PW stored in the area 9) in step (c).

Besides the "correct" password PW, which is formed in the discussed manner on the basis of the user-specific key $K_i$ and the tag-specific identifier TID in accordance with a known derivation, for example the mentioned hash method, the reader 3 generates some further "incorrect" passwords $PW_{f,j}$, as illustrated by the block 18 in FIG. 2, for example in a manner controlled by a random generator 19. The reader 3 then sends only the "correct" password PW, referred to hereinafter as $PW_r$, to the tag 1, but also at least one "incorrect" password $PW_{f,j}$.

Figure 3:
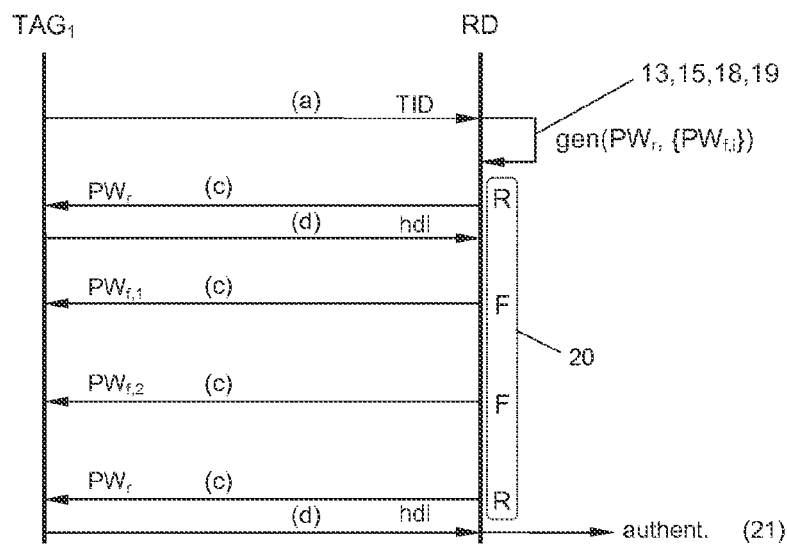
FIGS. 3 to 5 show sequence diagrams of the data exchange occurring over the radio interface between the RFID reader and RFID tag within the scope of the method, according to an embodiment.
Figure 4:
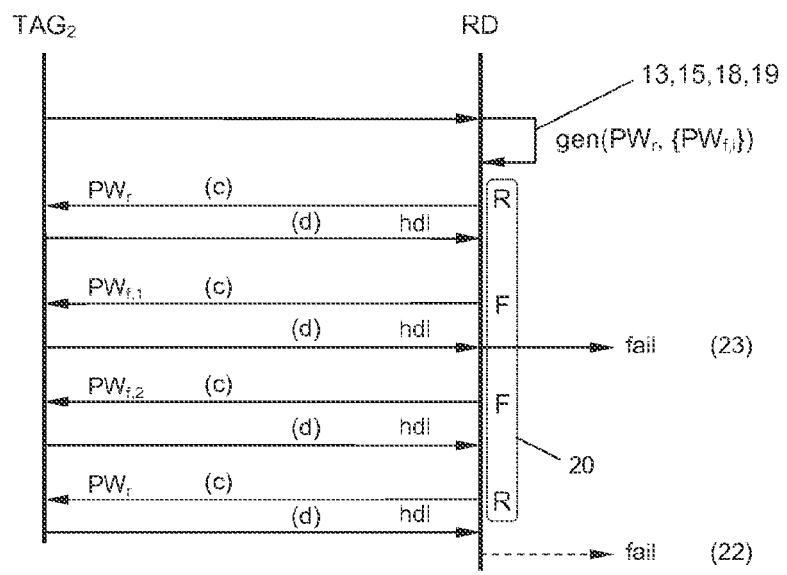
Figure 5:

FIG. 3 shows the response of a genuine, that is to say authentic, tag 1 (TAG$_1$) to such a series 20 of password transmissions (c). FIGS. 4 and 5, by contrast, show the response of a forged tag 1 (TAG$_2$) to the same series 20. The series 20 shown here by way of example is correct (R)-incorrect (F)-incorrect (F)-correct (R), that is to say $PW_r$-$PW_{f,1}$-$PW_{f,2}$-$PW_r$. As can be seen, the genuine RFID tag TAG$_1$ responds only to correct passwords $PW_r$ with a confirmation response hdl (d), whereas a forged or non-genuine RFID tag TAG$_2$, TAG$_3$ always responds with a confirmation response hdl (d), even in the case of incorrect passwords $PW_{f,1}$, $PW_{f,2}$.

The reader 3 (RD) then checks after, or during, the execution of the series 20 whether the correct series of responses (d) has also been received, that is to say, with the exemplary series 20 "R-F-F-R", whether a response series "hdl-no response-no response-hdl" is received. If no confirmation response hdl is received for any incorrect password $PW_{f,j}$, the tag 1 is authenticated (21), otherwise it is not (22).

As shown in the example of FIG. 4, the method can already be aborted and the tag 1 detected as non-authentic as soon as a confirmation response hdl is received (23) in response to an incorrect password $PW_{f,j}$.

The method can also be aborted and the tag 1 detected as non-authentic if no confirmation response hdl is received in response to a correct password $PW_r$—for example, within a period of time T—see step 24 in FIG. 5.

Not only can the content of the incorrect passwords $PW_{f,j}$ be generated randomly, but the order of correct and incorrect passwords in the series 20 can also be determined by the random number generator 19. The number of correct and incorrect passwords $PW_r$, $PW_{f,j}$ in the series 20 can be as large as desired—the higher the number, the more secure is the authentication method. At least one correct password $PW_r$ and one incorrect password $PW_f$ are necessary in the series 20. By way of example, password interrogations (c) can be continuously sent from the reader 3 to a tag 1, such that the series 20 is continued and the responses (d) are evaluated, as long as the tag 1 is within the range 4 of the reader 3.

In order to determine whether a tag 1 is still within the range 4 of a reader 3, that is to say if it is actually possible to respond to a correct password $PW_r$, the series 20 can also be fixed so as to be so short that the number of interrogations (c) in any case finds sufficient space within the period $t_3$-$t_1$ during which a tag 1 is moved at the speed 5 through the radio coverage range 4 of the reader 3. At the same time, it is possible to determine that the last password PW in the series 20 is in any case always a correct password $PW_r$, to which a confirmation response hdl can be expected. Alternatively or additionally, it is possible to determine with the aid of other measures whether a tag 1 is located within the range 4, for example by means of further radio interrogations from the reader 3 via the radio interface 2.

As soon as a tag 1 has been identified as false (steps 22, 23, 24), the tag identifier TID of this tag 1 can be stored in a blacklist 25 in the reader 3 or a unit connected thereto. The blacklist 25 can already be consulted in step (a), when the tag identifier TID of a tag 1 to be authenticated is interrogated, in order to determine whether the received identifier TID is present in the blacklist 25, and, if so, the tag 1 can be identified immediately as non-authentic.

Conclusion

The invention is not limited to the presented embodiments, but comprises all variants and modifications that fall within the scope of the accompanying claims.

What is claimed is:

1. A method for authenticating an RFID tag by means of an RFID reader via a Radio interface therebetween, wherein a user-specific key is stored in the RFID reader and a tag-specific identifier and a password generated from said tag-specific identifier and said user-specific key in accordance with a known derivative function are stored in the RFID tag, and wherein an authentic RFID tag sends back a confirmation response via the radio interface only upon receipt of a correct password, by contrast a non-authentic RFID tag sends back a confirmation response via the radio interface upon receipt of any password, comprising following steps performed in the RFID reader:
   receiving via the radio interface the tag-specific identifier of an RFID tag to be authenticated;
   generating the correct password from the received tag-specific identifier and the stored user-specific key in accordance with the known derivative function, and generating at least one incorrect password differing from the correct password;
   sending a series of at least two passwords, of which at least one is correct and at least one is incorrect, via the radio interface to the RFID tag; and
   authenticating the RFID tag if no confirmation response is received to any incorrect password.

2. The method according to claim 1, wherein an order of correct and incorrect passwords in said series is selected randomly.

3. The method according to claim 1, wherein the transmission of the series is aborted as soon as a confirmation response is received in response to an incorrect password.

4. The method according to claim 1, wherein the transmission of the series is aborted as soon as no confirmation response is received in response to a correct password, and the RFID tag is then not authenticated.

5. The method according to claim 1, wherein the last password of the series is a correct password.

6. The method according to claim 1, wherein the transmission of the series is continued as long as the RFID tag is within the range of the radio interface.

7. The method according to claim 6, wherein the range is measured by radio interrogations of the RFID tag output by the RFID reader.

8. The method according to claim 1, wherein the tag-specific identifier of an RFID tag that has transmitted a confirmation response in response to an incorrect password is stored in a blacklist.

9. The method according to claim 8, wherein, following the receipt of the tag-specific identifier of an RFID tag to be authenticated, it is checked whether the received tag-specific identifier is stored in the blacklist, and, if so, the RFID tag is not authenticated and the method is aborted.

10. The method according to claim 1, wherein the RFID tag and the RFID reader operate in accordance with standard ISO 18000-6C, ISO 18000-63, or a standard compatible therewith.

\* \* \* \* \*